UNITED STATES PATENT OFFICE.

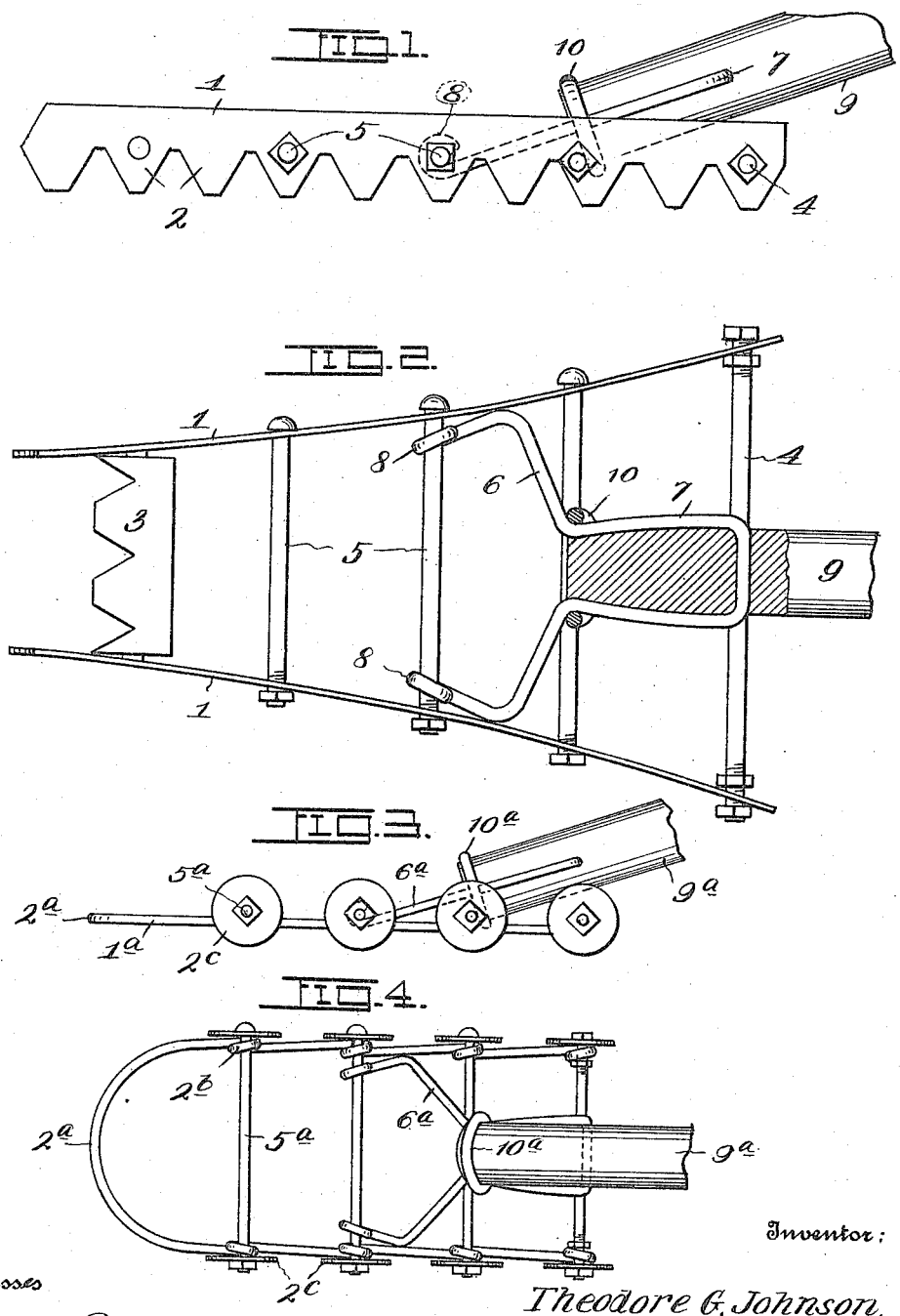

THEODORE G. JOHNSON, OF KANSAS CITY, MISSOURI.

GARDEN-TOOL.

1,184,856. Specification of Letters Patent. Patented May 30, 1916.

Application filed August 23, 1915. Serial No. 46,871.

*To all whom it may concern:*

Be it known that I, THEODORE G. JOHNSON, a citizen of the United States, residing at Kansas City, in the county of Jackson and State of Missouri, have invented certain new and useful Improvements in Garden-Tools, of which the following is a specification.

My invention relates to improvements in garden tools, and my object is to provide a simple and inexpensive device of this character whereby weeds and grass can be quickly eradicated and the soil pulverized at the expenditure of but little time and labor.

The device can be used to advantage in preparing the soil for seed beds and also in cultivating the soil around and between growing plants without injury thereto.

Other objects of the invention will hereinafter appear, and in order that said invention may be fully understood, reference will now be made to the accompanying drawing, in which:

Figure 1 is a side elevation of the preferred form of tool. Fig. 2 is a plan view thereof with the handle partly in section. Fig. 3 is a side elevation of a modified form of the device. Fig. 4 is a plan view of said modified form.

Referring now to the detail construction of the device, 1 designates a pair of rearwardly diverging blades provided at their under sides with teeth 2 of approximately V-form.

The blades 1 are spaced apart by a transverse blade 3, near the forward ends of the blades 1, and a transverse member 4 at the rear ends of said blades 1. Intermediate transverse members 5 connecting the blades are also employed.

6 designates a bail made, preferably, of one piece of wire bent at its central portion into a shank 7, and at its ends into loops 8 which are swiveled on one of the transverse members 5. The shank 7 extends through a wooden or other suitable handle 9, to which it is firmly connected by a ring 10.

When the tool is pushed forward and backward in the soil, the blades 1 and 3 loosen and cut up weeds, grass and other undesirable vegetation and pulverize the soil. The teeth 2 also sink into the soil until the transverse members 4 and 5 are partially or completely covered with soil, any lumps of which are broken up by falling over and beneath said transverse members. Owing to the comparatively narrow forward end of the device it can be readily inserted between closely growing plants for the purpose of pulverizing the soil and eradicating all objectionable vegetation. The device can also be used to advantage in leveling off uneven surfaces of the soil, and owing to the swiveled handle it is not necessary to work in a stooping position as with a hoe or other tool having a rigidly connected handle.

In the modified form disclosed by Figs. 3 and 4, disks are substituted for the blades. Referring in detail to said modified form, $1^a$ designates a wire frame made, preferably, of one piece of wire curved at its forward portion $2^a$ and provided at its sides with a series of loops $2^b$. $5^a$ designates a series of transverse members extending through the loops $2^b$ and provided with disks $2^c$. A bail $6^a$ is swiveled at its forward portion on one of the members $5^a$ and secured at its rear portion to a handle $9^a$, through which it extends. A ring $10^a$ assists in holding the bail and the handle together. When this form of device is pushed back and forth over the soil the wire frame $1^a$ and the transverse members $5^a$ sink into the soil and break up any lumps therein. The disks $2^c$ also assist in pulverizing the soil and reducing it to a mulch.

Having thus described my invention, what I claim and desire to secure by Letters Patent, is:

A device of the character described, comprising a pair of oppositely-disposed rearwardly-diverging cultivating appliances having serrated under edges, a cultivating blade uniting the forward portions of said cultivating appliances, a plurality of transverse cultivating members arranged in the rear of said blade and uniting the cultivating appliances, and a handle having swivel connection with one of said transverse cultivating members.

In testimony whereof I affix my signature, in the presence of two witnesses.

THEODORE G. JOHNSON.

Witnesses:
F. G. FISCHER,
L. J. FISCHER.